United States Patent
Pedersen

(10) Patent No.: US 7,874,805 B2
(45) Date of Patent: Jan. 25, 2011

(54) HUB FOR A WIND TURBINE

(75) Inventor: Gunnar K. Storgaard Pedersen, Skjern (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/781,415

(22) Filed: May 17, 2010

(65) Prior Publication Data
US 2010/0290918 A1 Nov. 18, 2010

Related U.S. Application Data

(60) Provisional application No. 61/179,123, filed on May 18, 2009.

(30) Foreign Application Priority Data

May 18, 2009 (DK) ............... 2009 70006
Mar. 29, 2010 (DK) ............... 2010 70132

(51) Int. Cl.
*F03B 3/12* (2006.01)
(52) U.S. Cl. ............... 416/204 R; 416/244 R; 416/245 R
(58) Field of Classification Search ............ 416/204 R, 416/219 R, 244 R, 244 A, 245 R; 290/44, 290/55

See application file for complete search history.

(56) References Cited

U.S. PATENT DOCUMENTS

| | | | |
|---|---|---|---|
| 4,272,929 A * | 6/1981 | Hanson | 416/142 |
| 4,311,434 A * | 1/1982 | Abe | 416/142 |
| 4,678,923 A * | 7/1987 | Trepanier | 290/55 |
| 6,285,090 B1 | 9/2001 | Brutsaert et al. | |
| 6,408,575 B1 * | 6/2002 | Yoshida et al. | 52/40 |
| 6,614,125 B2 * | 9/2003 | Willis et al. | 290/55 |
| 6,782,667 B2 * | 8/2004 | Henderson | 52/116 |
| 7,207,777 B2 * | 4/2007 | Bervang | 416/119 |
| 7,296,974 B2 * | 11/2007 | Wobben | 416/132 B |
| 7,708,523 B2 * | 5/2010 | Sakaue | 416/1 |
| 7,740,450 B2 * | 6/2010 | Cairo | 416/204 R |

FOREIGN PATENT DOCUMENTS

WO   WO 2008/098574   8/2008

OTHER PUBLICATIONS

Office Action issued by Denmark Patent and Trademark Office dated Dec. 23, 2009.

* cited by examiner

*Primary Examiner*—Igor Kershteyn
(74) *Attorney, Agent, or Firm*—Cohen Pontani Lieberman & Pavane LLP

(57) ABSTRACT

A hub for a wind turbine with a first end facing a nacelle of the wind turbine and a second end facing a direction opposite the nacelle. The hub has at least one opening between the first and second end, which opening is adapted for receiving a wind turbine blade, and the hub is adapted to rotate in relation to the nacelle by means of the wind turbine blade. A self-supporting front structure is connected to the second end of the hub, the front structure extending from the second end of the hub and away from the nacelle and being arranged to support a spinner module, the spinner module being adapted to house the front structure and hub. The front structure has a projecting part, which is part of the self-supporting structure and can extend from the front structure and away from the nacelle and has a connection point.

21 Claims, 13 Drawing Sheets

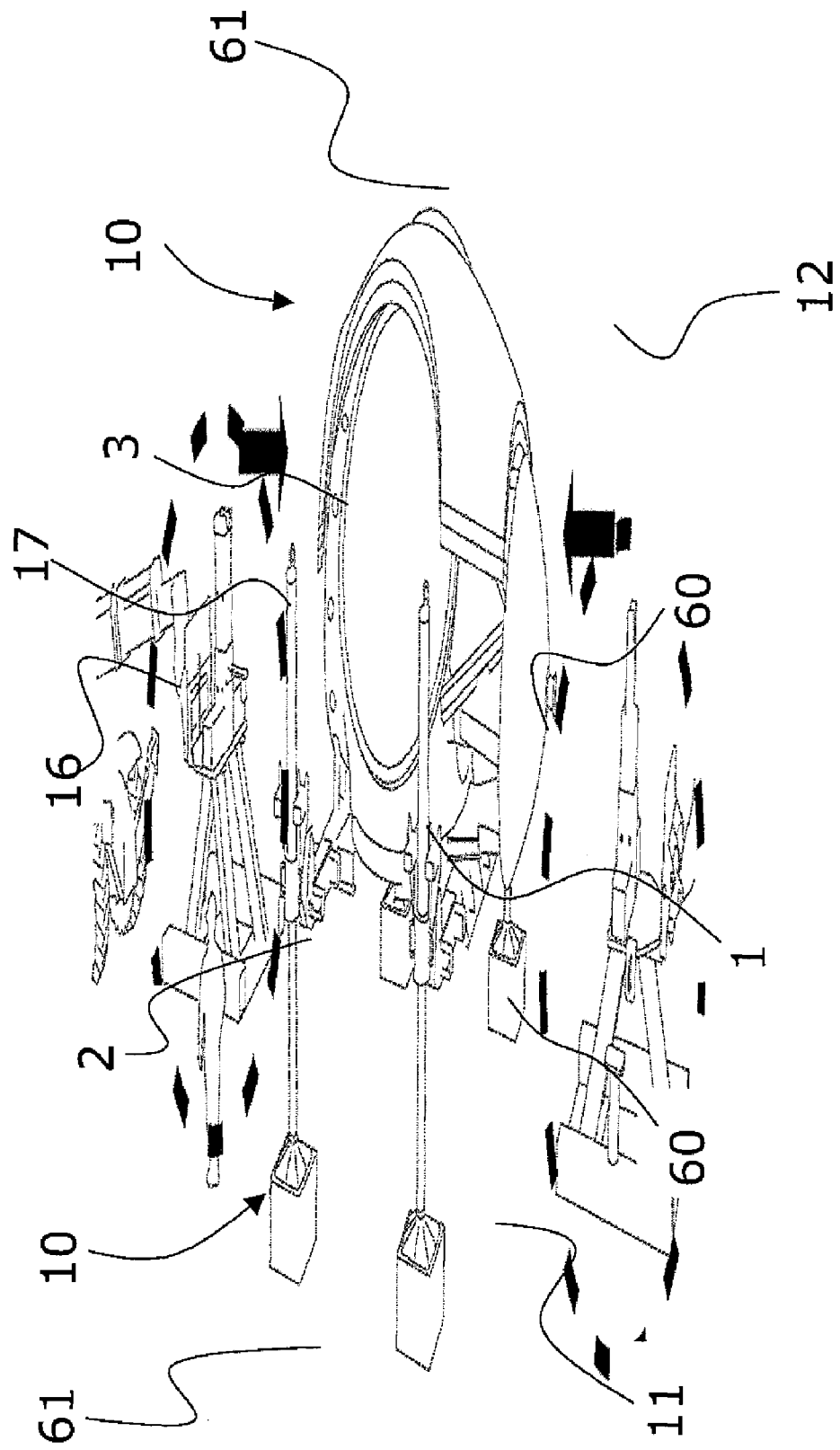

HUB FOR A WIND TURBINE

RELATED APPLICATIONS

This application claims priority from U.S. Provisional Patent Application Ser. No. 61/179,123 filed on May 18, 2009, Denmark PA 200970006 filed May 18, 2009 and Denmark PA 201070132 filed Mar. 29, 2010. The entire contents of which are incorporated by reference.

TECHNICAL FIELD OF THE INVENTION

The present invention relates to a hub for a wind turbine comprising a first end facing a nacelle of the wind turbine, and a second end facing a direction opposite the nacelle. The hub comprises at least one opening between the first and second end, which opening is adapted for receiving a wind turbine blade, and the hub is adapted to rotate in relation to the nacelle by means of the wind turbine blade. A self-supporting front structure is connected to the second end of the hub, the front structure extending from the second end of the hub and away from the nacelle and being arranged to support a spinner module, the spinner module being adapted to house the front structure and the hub.

The present invention also relates to a frame structure for supporting a hub as well as methods for mounting a spinner module on a hub, mounting a hub on a nacelle of a wind turbine, performing maintenance and/or inspection work on one or more wind turbine blades and/or other wind turbine elements, and mounting/dismounting a wind turbine blade on a hub, respectively.

In addition the present invention relates to a wind turbine.

BACKGROUND ART

As the size of wind turbines increases, the size of all the different elements of wind turbines increases as well. This makes handling of the different elements cumbersome, particularly during manufacture, transport to the site where a wind turbine is to be erected, the actual site handling and mounting/connection of different elements before they are installed on the wind turbine, and the different hoisting and lifting procedures.

Especially the wind turbine hub is increasing in size and, thus, in weight, which again makes the handling of the hub difficult with a large number of handling procedures, for instance during transport, site handling, mounting of components inside the hub, mounting of a spinner module around the hub, and the actual installation of the hub on the wind turbine nacelle. There is thus a need for providing a hub which is easier to handle.

SUMMARY OF THE INVENTION

An object of the present invention is, at least partly, to overcome the above disadvantages and drawbacks of the prior art. More specifically, it is an object to provide a hub which is easier to handle during transport, site handling, mounting, and installation.

It is also an object of the present invention to provide a hub which, after mounting, may facilitate maintenance and inspection of certain wind turbine elements and components.

It is moreover an object of the present invention to provide a hub which facilitates mounting/demounting of wind turbine blades and other components.

The above objects, together with numerous other objects, advantages, and features which will become evident from the below description, are accomplished by a solution in accordance with the present invention, wherein the front structure comprises a projecting part which is part of the self-supporting structure and can extend from the front structure and away from the nacelle and comprises a connection point.

The hub is thus easier to handle during transport, mounting of the spinner module, and installation of the hub on a wind turbine nacelle. Due to the projecting part with the connection point, which is part of the self-supporting front structure, it is possible to use the connection point to connect hoisting arrangements as well as other devices, which thus facilitates handling of the hub.

The term "self-supporting" is in this context construed as the structure is able to carry its own load as well as a part of the load from the hub.

In one embodiment according to the invention, the connection point may be adapted to be connected to a lifting arrangement during transport, lift to a vessel, or the like, site handling of the hub and/or during installation of the hub on the wind turbine.

In another embodiment according to the invention, a hoisting device may be connected to the connection point.

Furthermore, a guide wire or strap may be connected to the connection point.

In one embodiment according to the invention, the connection point may be adapted to be connected to a frame structure during mounting of the spinner module.

In addition, the projecting part may be either extendably arranged or securely connected to the front structure.

When the projecting part is extendably arranged, it may be extended during use and drawn back into the front structure when it is not in use. Thus, when not in use, the projecting part may be invisible. When the projecting part instead is securely connected to the front structure, it is possible to separate it from the front structure, for instance when room for exchange of components or movement inside the hub is necessary.

The projecting part may be moved in relation to the front structure, even when an element is connected to the connection point. Furthermore, the connection point may as well be movably arranged on the projecting part, so that the connection point can be displaced or moved along the projecting part. Accordingly, both the projecting part and the connection point may be movably arranged, independently or dependently of each other, when an element is connected to the connection point.

Moreover, the connection point of the projecting part may be positioned outside the spinner module. In this way, the connection point is available at all times, which again facilitates handling of the hub when the spinner module is mounted.

According to the invention, the projecting part may be adapted to carry up to half the weight of a complete weight of the hub and front structure. A standard hub with front structure has a complete weight between 20,000 and 40,000 kg, however, since the sizes increases of the wind turbines, the sizes of the hub increases as well and thereby also their weight.

In one embodiment of the invention, the front structure may be securely connected to the hub, e.g. via a bolt connection, a weld connection, or the like.

Furthermore, the front structure may comprise a plurality of profiles, which in one end are connected to the hub and extend from the hub so that they, in the end opposite the hub, are connected to each other, creating a substantially pyramidal configuration of the front structure.

In addition, the front structure may comprise one or more internal connection points in connection with one or more of the profiles, enabling components positioned in the hub to be hoisted and displaced by use of the internal connection points. It is thus possible to move components from the hub out towards the projecting part, after which the components may be lowered through an opening in the spinner module by means of, for instance, a hoisting device connected to the connection point of the projecting part. Again, handling procedures, which in the prior art were very cumbersome, is thus facilitated.

In an embodiment of the invention, the spinner module may comprise openings in relation to the front structure, enabling components to be hoisted to or lowered from the hub through the openings. It is particularly advantageous when the openings are displaced in relation to the profiles of the front structure, since this facilitates handling of the different components which may be lowered from the openings and/or hoisted up to hub.

Also, the hub may comprise at least one additional connection point, enabling hoisting arrangements also to be connected to the hub itself, which again facilitates the handling.

The present invention also relates to a wind turbine comprising a hub having any one or all of the above-mentioned technical features.

The present invention also relates to a frame structure for supporting a hub having any or all of the above-mentioned technical features during handling of the hub and/or mounting of a spinner module, the frame structure comprising:
 a first supporting element adapted to be connected with a first end of the hub, and
 a second supporting element adapted to support a connection point of a projecting part of a front structure connected to a second end of the hub.

Placing the hub on the frame structure according to the invention facilitates the fitting of components inside the hub as well as the mounting of the spinner module. Furthermore, more ergonomic working postures for the persons working with the hub are provided. Additionally, when the hub is placed on the frame structure, a crane is not needed until the actual point of installation of the hub, which minimises the cost of crane support on the erecting site.

In one embodiment, the hub may be rotatably supported by the frame zo structure. The hub may thus be rotated in relation to the tasks and fittings to be performed on the hub.

Also, at least one of the supporting elements may comprise means for rotating the hub.

The present invention also relates to a method for mounting a spinner module on a hub according to any one of the above-mentioned technical features, the method comprising the steps of:
 placing the hub on a frame structure, a first end of the hub thus being connected to a first supporting element of the frame structure, a connection point of a projecting part of a front structure, which is connected to a second end of the hub, being supported by a second supporting element of the frame structure,
 mounting a first cover element of the spinner module,
 rotating the hub on the frame,
 mounting a second cover element of the spinner module, and
 performing the above steps of rotating the hub and mounting the cover element until the hub is housed in the spinner module.

This offers an efficient method for mounting the spinner module on the hub, minimising the need for additional crane support and handling steps.

The present invention further relates to a method for mounting a hub having any or all of the above-mentioned technical features on a wind turbine nacelle, the method comprising the steps of:
 connecting a lifting arrangement to the hub and to a connection point of a projecting part of a front structure, the front structure being connected to the hub,
 hoisting the hub up to the nacelle, and
 connecting the hub to a main shaft of the nacelle.

By using the connection point of the projecting part as well as the hub as lifting points, lifting and thereby installation of the hub is facilitated.

In addition, the present invention relates to a method for performing maintenance and/or inspection work on one or more wind turbine blades and/or other wind turbine elements, the method comprising the steps of:
 connecting a hoisting device to a connection point of a projecting part of a front structure, the front structure being connected to a hub having any or all of the above-mentioned technical features,
 connecting an element adapted for housing one or more persons to the hoisting device,
 placing one or more persons in the element, and
 hoisting the element up along the wind turbine while the persons perform the maintenance and/or inspection work.

Furthermore, when the hub is installed on the wind turbine, the connection point of the projecting part may as well be used as a hoisting point. Thus, extra crane capacity is rendered unnecessary during maintenance, service and inspection, making these tasks both easier and less expensive to perform than in the prior art solutions.

The present invention moreover relates to a method for mounting a wind turbine blade on a hub having any or all of the above-mentioned technical features, the method comprising the steps of:
 connecting a hoisting device to the hub via an opening in the hub,
 connecting the hoisting device to a root end of a wind turbine blade,
 placing a support element completely or partly around the wind turbine blade,
 connecting a guide wire or strap or a second hoisting device to a connection point of a projecting part of a front structure, the front structure being connected to the hub,
 connecting the guide wire or strap or the second hoisting device to the support element,
 hoisting the wind turbine blade up to the hub while using the connection point for guiding and/or balancing the wind turbine blade, and
 connecting the root of the wind turbine blade to a pitch bearing of the hub.

The present invention also relates to a method for demounting a wind turbine blade from a hub having any or all of the above-mentioned technical features, the method comprising the steps of:
 connecting a hoisting device to the hub via an opening in the hub,
 connecting the hoisting device to a root end of a wind turbine blade,
 placing a support element completely or partly around the wind turbine blade,
 connecting a guide wire or strap or a second hoisting device to a connection point of a projecting part of a front structure, the front structure being connected to the hub,
 connecting the guide wire or strap or the second hoisting device to the support element, or lifting the blade only in the front, demounting the root of the wind turbine blade from a pitch bearing of the hub, and lowering the wind turbine blade from the hub while using the connection point for guiding and/or balancing the wind turbine blade.

In addition, the connection point of the projecting part may also be used during mounting and demounting of one or more wind turbine blades, once again making the procedure more efficient and rendering additional crane capacity unnecessary. Thus, when using the above-mentioned methods, installation of the wind turbine blades as well as service, replacement, and repair work is much less expensive than in the solutions of prior art.

Finally, the present invention relates to a method for hoisting one or more components up to a hub according to any of claims 1 to 11, the method comprising the steps of:

connecting a hoisting device to a connection point of a projecting part of a front structure, the front structure being connected to a hub, connecting a component to the hoisting device, connecting a guide wire or strap to the front structure through an opening or hatch in the spinner module, connecting the guide wire or strap to the component, hoisting the component up to the opening or hatch while pulling the guide wire or strap to align the component with the opening or hatch, and pulling the component in through the opening or hatch.

When a component is to be replaced or repaired, the above-mentioned method may as well be used, which will be appreciated by the skilled person.

BRIEF DESCRIPTION OF THE DRAWINGS

The invention and its many advantages will be described in more detail below with reference to the accompanying schematic drawings which, for the purpose of illustration, show some non-limiting embodiments, and in which.

All the drawings are schematic and not necessarily to scale, and they show only those parts which are necessary in order to elucidate the invention, other parts being omitted or merely suggested.

DESCRIPTION OF PREFERRED EMBODIMENTS

Figure 1:
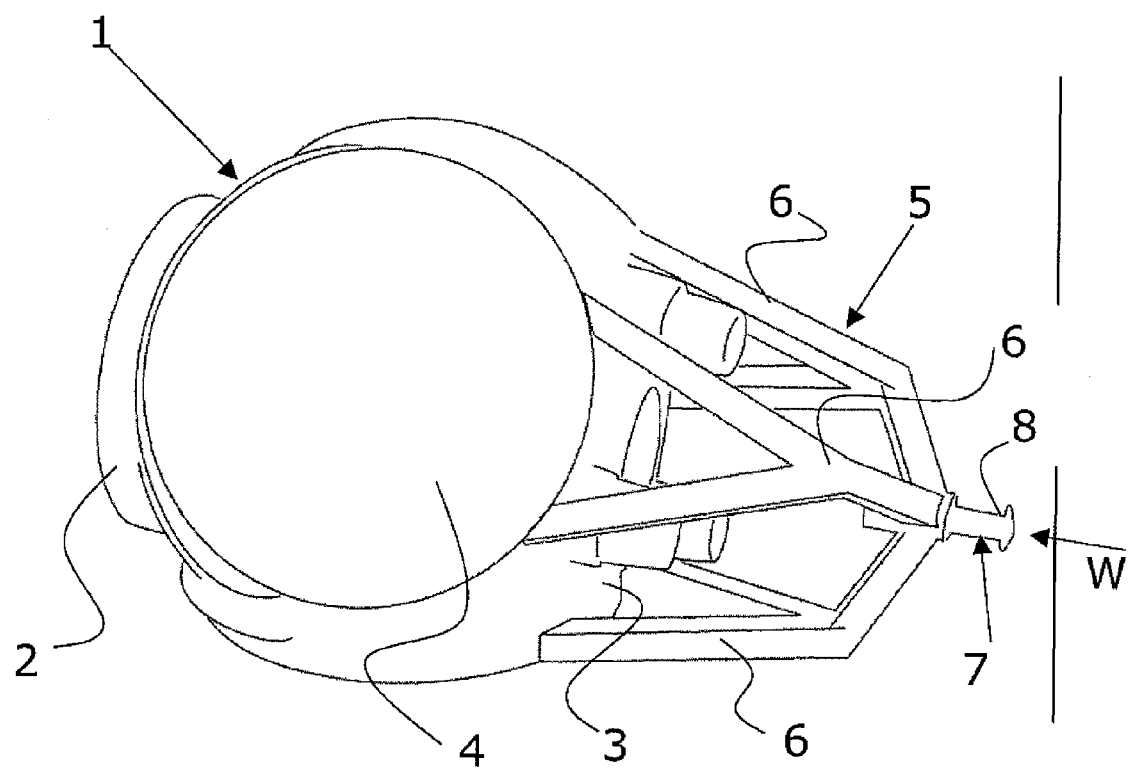
FIG. 1 shows a hub according to the invention.

In FIG. 1, a hub 1 according to the invention is shown. The hub 1 comprises a first end 2 facing a nacelle (not shown) of the wind turbine, and a second end 3 facing a direction opposite the nacelle. Between the first 2 and second 3 end, the hub 1 comprises at least one opening 4, the opening 4 being adapted for receiving a wind turbine blade (not shown). The hub 1 is adapted to rotate in relation to the nacelle by means of the wind turbine blade.

The nacelle of the wind turbine normally houses a generator and other wind turbine components used for driving the conversion process of wind energy to electricity—also called the drive train. The drive train may have different configurations, e.g. a main shaft, gearbox, and generator or a direct drive generator with or without a main shaft. In other configurations, one or more of the wind turbine components, for instance the generator, may be placed outside the nacelle. Thus, the present invention may be used in a large variety of different conversion process configurations, which will be appreciated by the skilled person.

A self-supporting front structure 5 is connected to the second end 3 of the hub 1, the front structure 5 extending from the second end 3 of the hub 1 and away from the nacelle. The front structure 5 is arranged to support a spinner module (not shown), which is adapted to house the front structure 5 and the hub 1. The front structure 5 may be securely connected to the hub 1, e.g. via a bolt connection, a weld connection, or the like.

Furthermore, the front structure 5 may comprise a plurality of profiles 6, one end of which is connected to the hub 1. The profiles 6 extend from the hub 1, and the ends of the profiles opposite the hub are connected to each other, creating a substantially pyramidal configuration of the front structure 5.

The front structure 5 comprises a projecting part 7, which is part of the self-supporting structure and can extend from the front structure 5 and away from the nacelle. The projecting part 5 comprises a connection point 8. The projecting part 5 may be adapted to carry up to 50% of a complete weight of the hub and front structure. A standard hub with front structure has a complete weight between 20,000 and 40,000 kg; however, since wind turbines continue to increase in size, the size of the hub, and thus its weight, increases as well.

The present invention will mainly be described in connection to an upwind wind turbine, i.e. a wind turbine where the nacelle is placed downwind from the wind turbine blades. However, it will also be advantageous to implement the invention in a downwind wind turbine, i.e. a wind turbine where the nacelle is placed upwind from the wind turbine blades.

Figure 2:
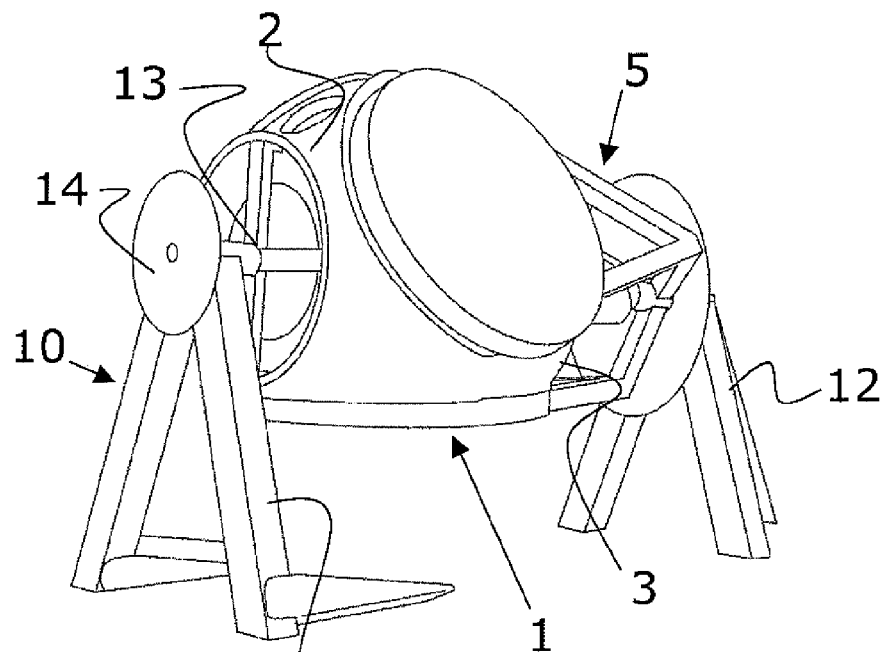
FIG. 2 shows a hub supported on a frame structure.

FIG. 2 shows another aspect of the invention, namely a frame structure 10 for supporting the hub 1 during handling of the hub and/or mounting of a spinner module (not shown). The frame structure 10 comprises a first supporting element 11 adapted to be connected a first end 2 of the hub 1. The first supporting element 11 consists of two leg elements, on which a connection element 13 rests. In this embodiment, the connection element 13 is connected to the main shaft bearing of the hub 1. Furthermore, the hub 1 is rotatably supported by the frame structure 10, and the first supporting element 11 comprises means 14 adapted for rotating the hub 1, for instance during mounting of the spinner module.

The frame structure 10 also comprises a second supporting element 12 adapted to support a connection point (not shown) of a projecting part of a front structure 5, which front structure 5 is connected to a second end 3 of the hub 1. In this embodiment, the second supporting element 12 consists of three leg elements creating a tripod providing a safe support for the hub, especially during rotation of the hub 1.

Figure 3:
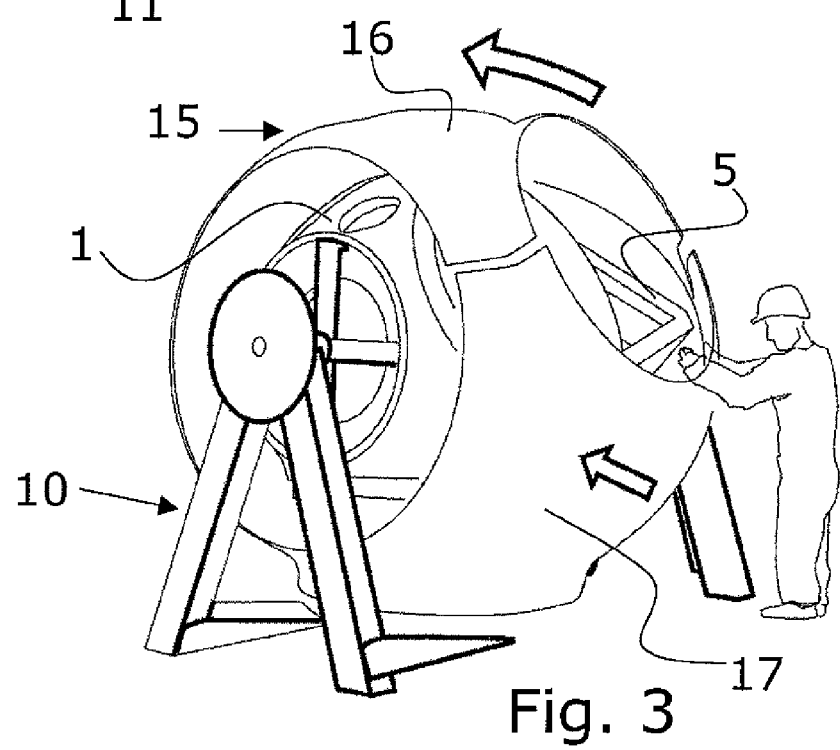
FIG. 3 shows a spinner module being mounted on the hub while the hub is supported on the frame structure.

FIG. 3 schematically shows how the spinner module 15 may be mounted around the hub 1 and front structure 5.

The spinner module 15 may be mounted on the hub 1 by:
placing the hub 1 on a frame structure 10, a first end of the hub thus being connected to a first supporting element of the frame structure, a connection point of a projecting part of a front structure, which is connected to a second end of the hub, being supported by a second supporting element of the frame structure,
mounting a first cover element 16 of the spinner module 15,
rotating the hub 1 on the frame structure 10,
mounting a second cover element 17 of the spinner module 15, and
performing the above steps of rotating the hub 1 and mounting the cover element until the hub 1 is housed in the spinner module 15.

Figure 4:
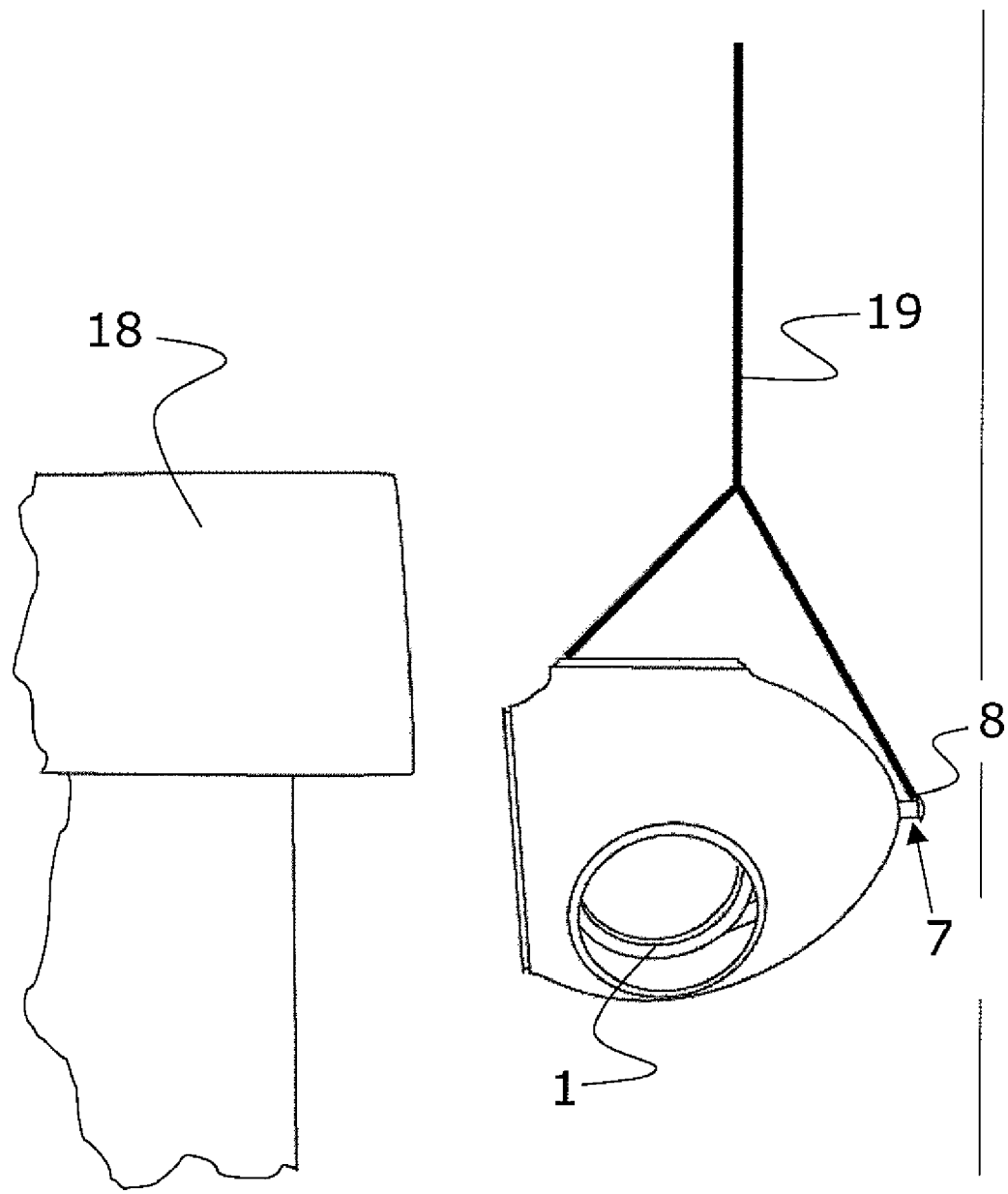
FIG. 4 shows a hub according to the invention being installed on a nacelle of a wind turbine.

In FIG. 4, another aspect of the invention is shown. In this aspect, the hub 1 is being mounted on the nacelle 18 of the wind turbine. According to the invention, the hub 1 may be installed using the following method:
connecting a lifting arrangement 19 to the hub 1 and to a connection point 8 of a projecting part 7 of a front structure (not shown), the front structure being connected to the hub 1,
hoisting the hub 1 up to the nacelle 18, and
connecting the hub 1 to a main shaft of the nacelle via the main shaft bearing.

Figure 5:
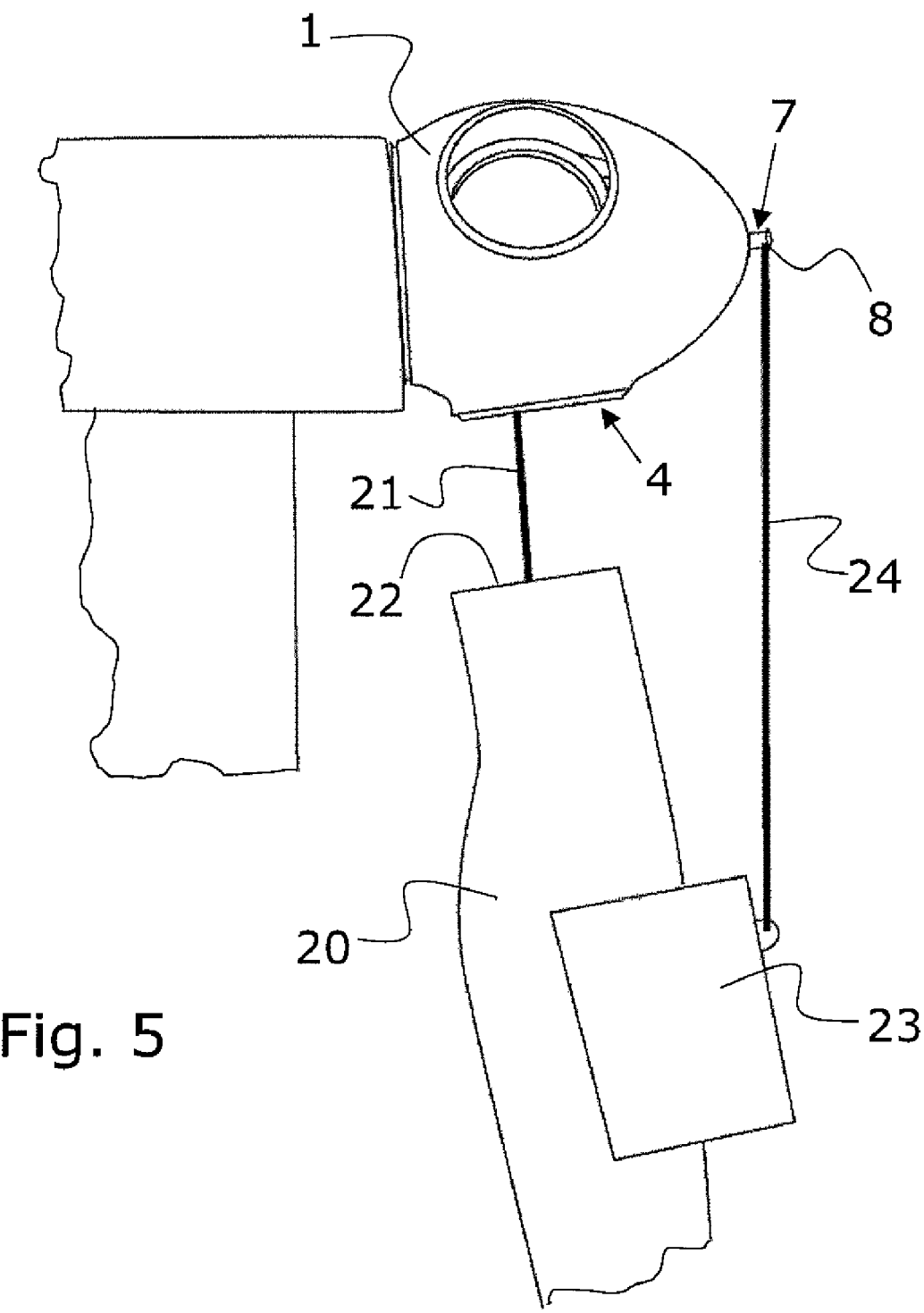
FIG. 5 shows a wind turbine blade being mounted/dismounted on/from a hub.

FIG. 5 shows a further aspect of the invention. This aspect is a method for mounting a wind turbine blade 20 on a hub 1, the method comprising the steps of:
connecting a hoisting device 21 to the hub 1 via an opening 4 in the hub 1,
connecting the hoisting device 21 to a root end 22 of the wind turbine blade 20,
placing a support element 23 completely or partly around the wind turbine blade 20,
connecting a guide wire 24 or strap or a second hoisting device to a connection point 8 of a projecting part 5 of a front structure (not shown), the front structure being connected to the hub,
connecting the guide wire 24 or strap or the second hoisting device to the support element 23,
hoisting the wind turbine blade 20 up to the hub 1 while using the connection point 8 for guiding and/or balancing the wind turbine blade 20, and
connecting the root 22 of the wind turbine blade 20 to a pitch bearing (not shown) of the hub 1.

When the wind turbine blade 20 is to be dismounted, the following method may be used:
connecting a hoisting device 21 to the hub 1 via an opening 4 in the hub 1,
connecting the hoisting device 21 to a root end 22 of a wind turbine blade 20,
placing a support element 23 completely or partly around the wind turbine blade 20,
connecting a guide wire 24 or strap or a second hoisting device to a connection point 8 of a projecting part 7 of a front structure (not shown), the front structure being connected to the hub 1,
connecting the guide wire 24 or strap or the second hoisting device to the support element 23,
demounting the root end 22 of the wind turbine blade 20 from a pitch bearing (not shown) of the hub 1, and
lowering the wind turbine blade 20 from the hub 1 while using the connection point 8 for guiding and/or balancing the wind turbine blade 20.

Figure 6:
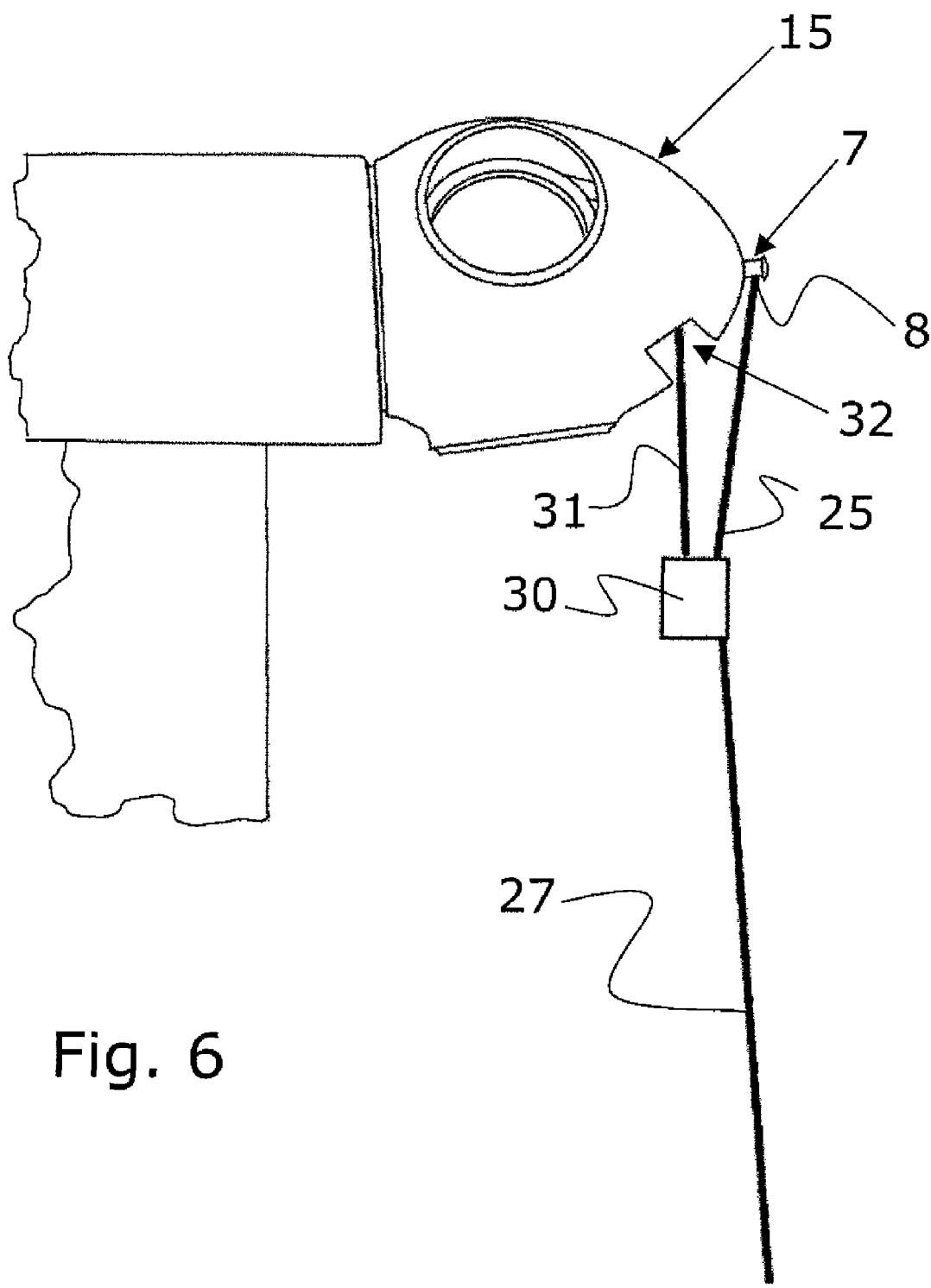
FIG. 6 shows a component being hoisted up to the hub using the connection point according to the invention.

FIG. 6 shows how the connection point 8 may as well be used in connection with installation, removal, replacement, or the like of components which are to be positioned inside the hub, front structure, or even inside the nacelle. This is facilitated by a method comprising the steps of:
connecting a hoisting device 25 to a connection point 8 of a projecting part 7 of a front structure, the front structure being connected to a hub,
connecting a component 30 to the hoisting device 25,
connecting a guide wire or strap 31 to the front structure through an opening 32 or hatch in the spinner module 15,
connecting the guide wire or strap 31 to the component 30,
hoisting the component 30 up to the opening 32 or hatch while pulling the guide wire or strap 31 to align the component 30 with the opening 32 or hatch, and
pulling the component 30 in through the opening 32 or hatch.

The guide wire or strap 31 may as well be a separate hoisting device, which may take over the load from the hoisting device 25 when the component is aligned with the opening, facilitating handling of the component inside the spinner module and hub. Furthermore, the hoisting device 25 connected to the connection point 8 may be replaced by a guide wire or strap when a hoisting device is connected to the front structure and the component via the opening.

Figure 7:
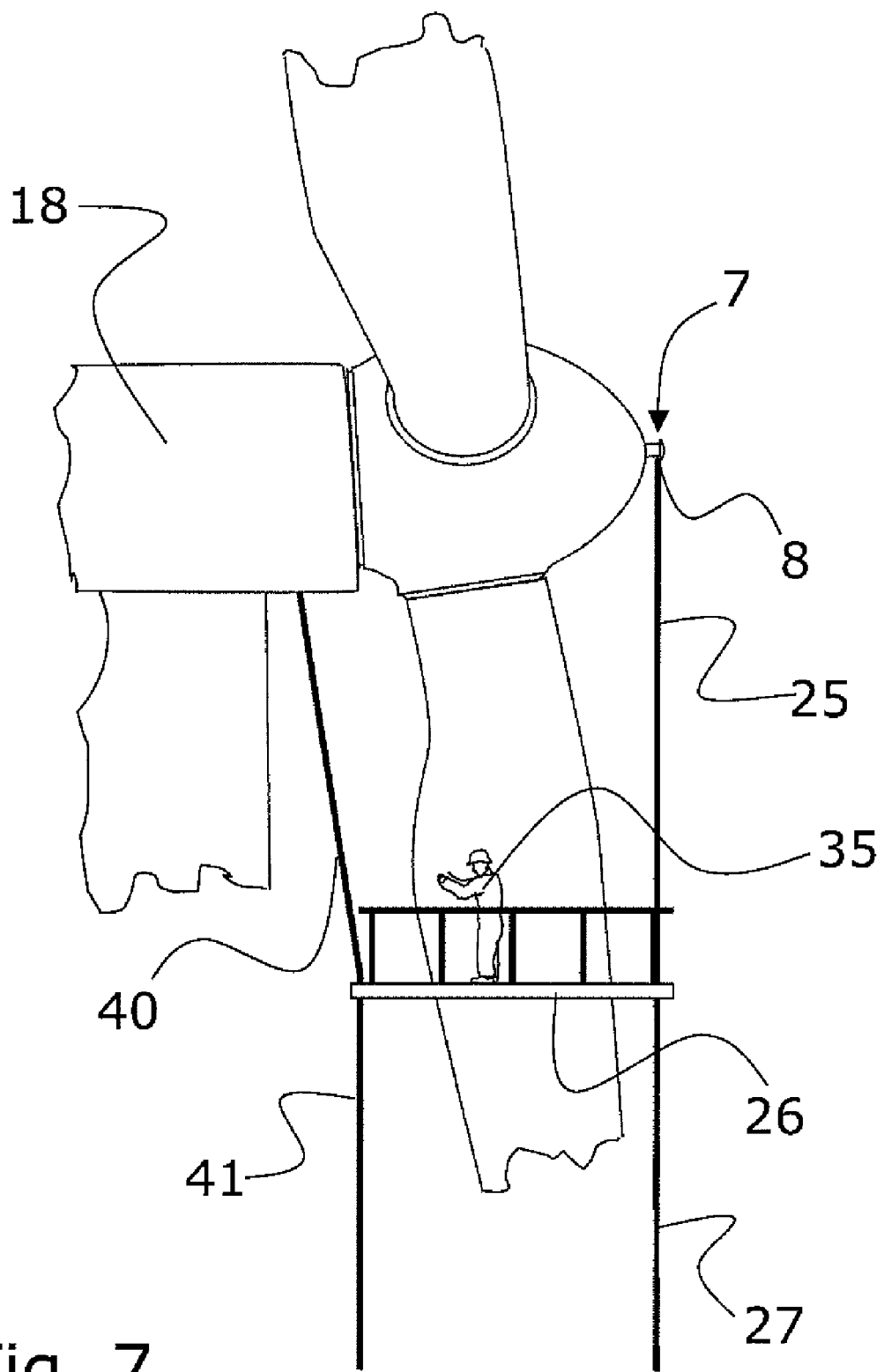
FIG. 7 shows an element adapted for housing one or more persons being hoisted up towards the hub using the connection point according to the invention.

According to an additional aspect of the invention, maintenance and/or inspection work on one or more wind turbine blades and/or other wind turbine elements may be performed by means of the following method, which is schematically shown in FIG. 7. The method comprises the steps of:
connecting a hoisting device 25 to a connection point 8 of a projecting part 7 of a front structure, the front structure being connected to a hub 1,
connecting an element 26 adapted for housing one or more persons to the hoisting device 25,
placing one or more persons 35 in the element 26, and
hoisting the element 26 up along the wind turbine while the persons 35 performing maintenance and/or inspection work.

Connecting a guide strap 27 to the element 26 to control and hold the element 26 steady during the maintenance and/or inspection procedures provides a further advantage.

The element 26 may as well be used for hoisting persons 35 up to the hub 1, making it possible for the persons to get access to the hub via one of the hatches in the spinner module.

Furthermore, an additional hoisting device 40 may also be connected to the element 26, which hoisting device 40 extends between the element 26 and the hub 1 or the nacelle 18. In this embodiment it is connected to the nacelle 18. A guide strap 41 may be connected to the element 26 below the connection point for the hoisting device 40. Hereby is obtained that the element 26 is controlled and held steady while hoisting up persons or while the persons perform maintenance, inspection, or repair work.

Figure 8:
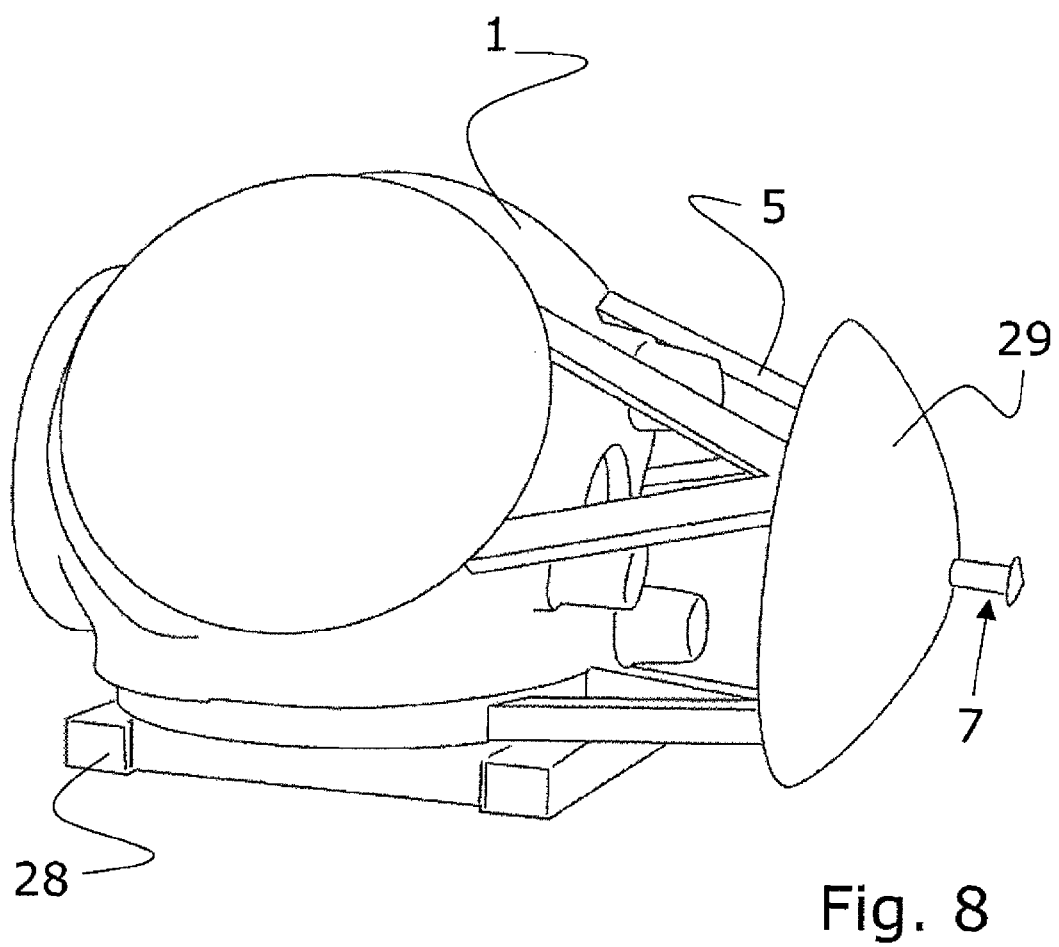
FIG. 8 shows a hub placed on a transport frame, resting on a pitch bearing of the hub.

In FIG. 8 a hub 1 according to the invention is shown placed on a transportation frame 28. The hub 1 rests on one of the pitch bearings so that the overall height of the hub and front structure is minimised. Furthermore, in this embodiment, a front part 29 of the spinner module is mounted on the front structure 5, and the projecting part 7 is positioned outside the front part 29 of the spinner module.

Figure 9:
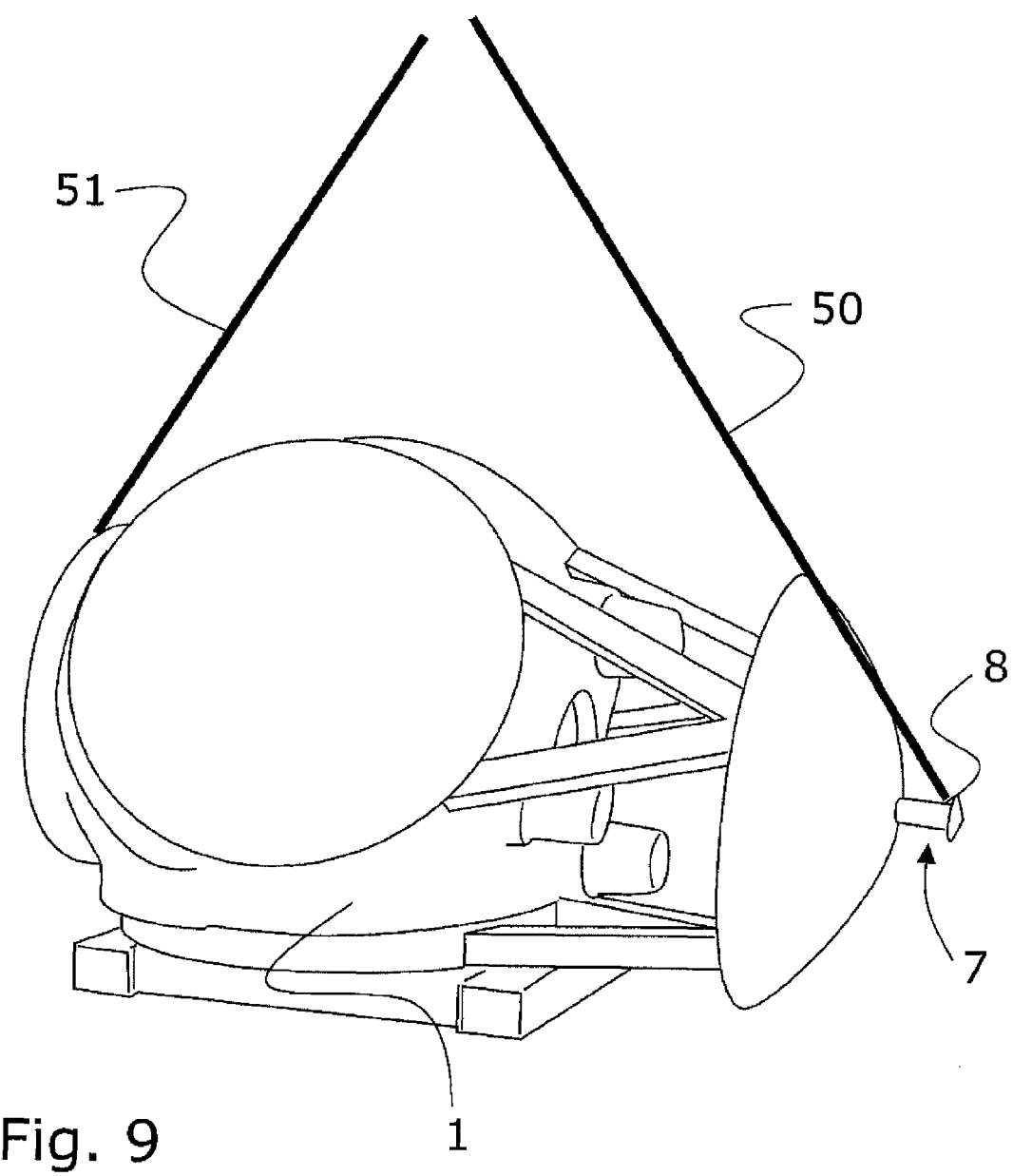
FIG. 9 shows the hub of FIG. 8, wherein a lifting arrangement is connected to the hub.

In FIG. 9, the hub of FIG. 8 is shown. Here, a first hoisting wire or strap 50 is connected to the connection point 8 of the projecting part 7 and a second hoisting wire or strap 51 is connected to the hub 1. In the opposite ends, the hoisting wires or straps 50, 51 may be connected to a hoisting arrangement (not shown) or a yoke. Furthermore, when transporting the hub on one of its pitch bearings, the overall height of the hub during transport is kept as low as possible, which makes it easier to transport. Furthermore, it will be possible to connect hoisting wires or straps to the hub substantially without use of ladders or the like, whereby the handling and transportation is facilitated.

Figure 10:
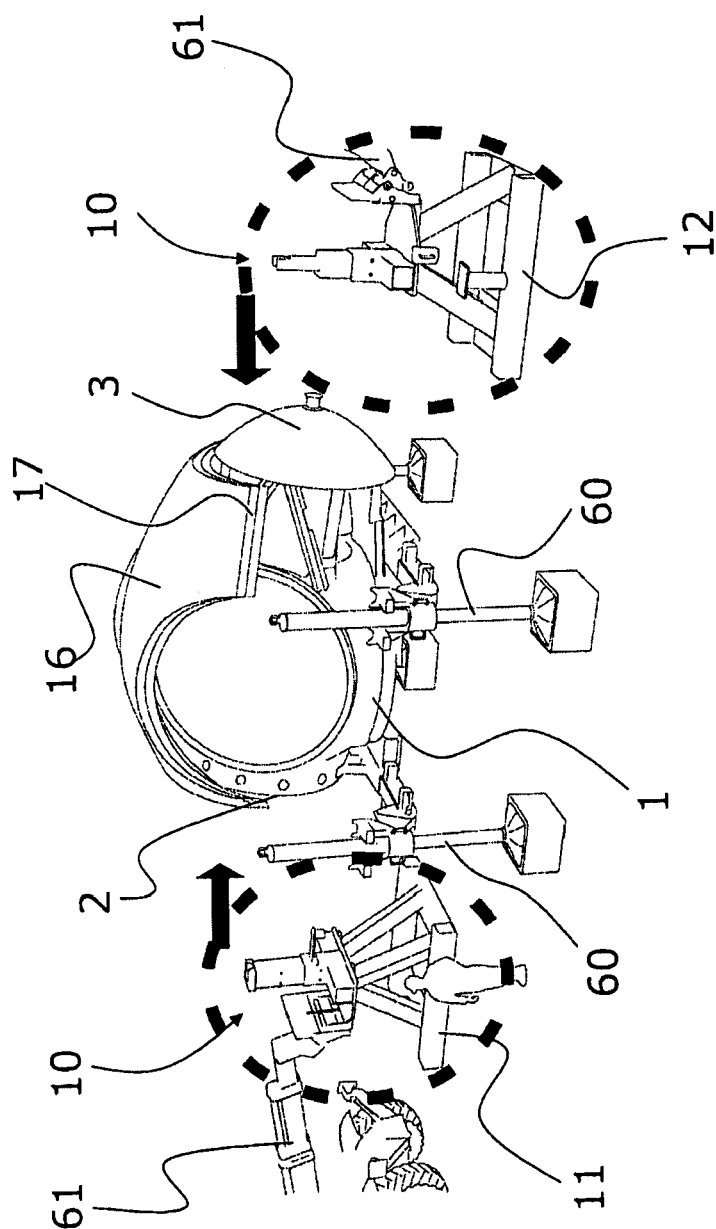
FIG. 10 shows the hub being placed on a frame structure.

In FIG. 10, the hub 1 is lifted up in a first position, wherein it is ready to be lowered onto the frame structure 10. This lifting procedure is in the present embodiment performed by arranging four hydraulic legs 60 around the hub 1. Subsequently, the first supporting element 11 and the second supporting element 12 of the frame structure 10 are arranged at the first end 2 and the second end 3 of the hub 1, respectively. The supporting elements 11, 12 are in this embodiment arranged on the hub 1 by means of fork lifts 61.

When the supporting elements 11, 12 have been arranged on the hub 1, the hydraulic legs 60 are lowered so that the hub 1 is lowered to a second position, wherein it is supported and carried by the frame structure 10. Subsequently, the hydraulic legs 60 are removed, for instance by means of the fork lifts 61, and the transportation frame may also be dismounted from the hub 1 if this has not previously been performed.

In the shown embodiment, the cover elements 16, 17 of the spinner module are stacked on top of the hub 1 during transportation, whereby both the hub and the spinner module may be transported together expediently without entailing a large transportation height.

Figure 11:
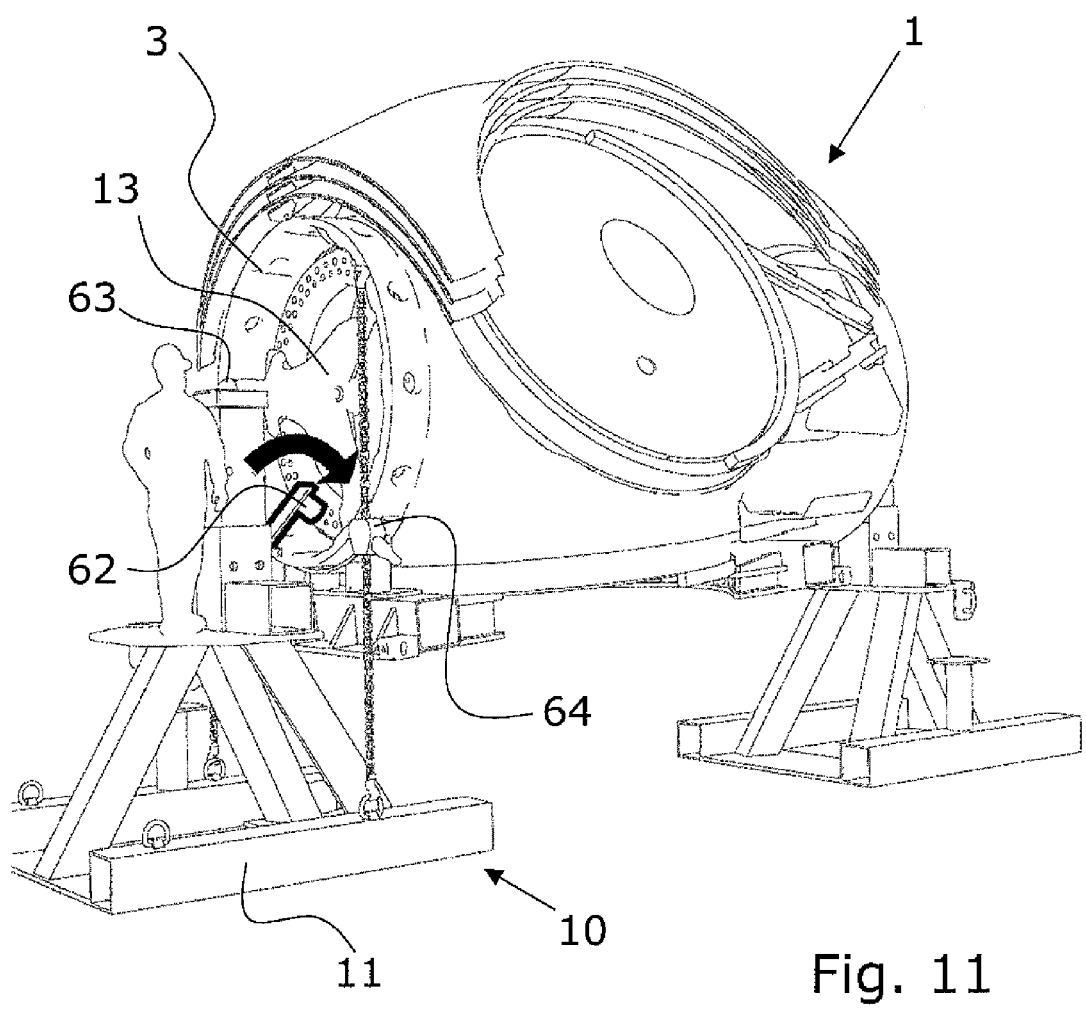
FIG. 11 shows the hub placed on the frame structure being locked to avoid unintended rotation of the hub on the frame structure.

In FIG. 11, the hub 1 is supported and carried by the frame structure 10. In the first end 2 of the hub 1, the connection element 13 is fastened to the main shaft bearing, and the connection element is a spoke. In this embodiment, the spoke comprises three arms which are connected to the main shaft bearing. Furthermore, the hub may comprise a plurality of radial holes arranged around the periphery of the first end 2. In the other end, the spoke is rotatably connected to the first supporting element 11. A supporting element lock 63 is arranged in the connection between the spoke and the first supporting element 11 to ensure that the spoke is securely connected to the supporting element and to avoid unintended displacement of the hub 1 during rotation.

Furthermore, a hub rotation lock 62 is arranged in connection to the first supporting element 11. The hub rotation lock 62 may be inserted into one of the radial holes of the hub 1 whereby the hub 1 is secured, which makes rotation of the hub 1 impossible.

Furthermore, on each side of the first supporting element 11, chain ratchets 64 are arranged which are only visible on one side of the supporting element. The chain ratchets 64 are used when the hub 1 is to be rotated.

Figure 12:
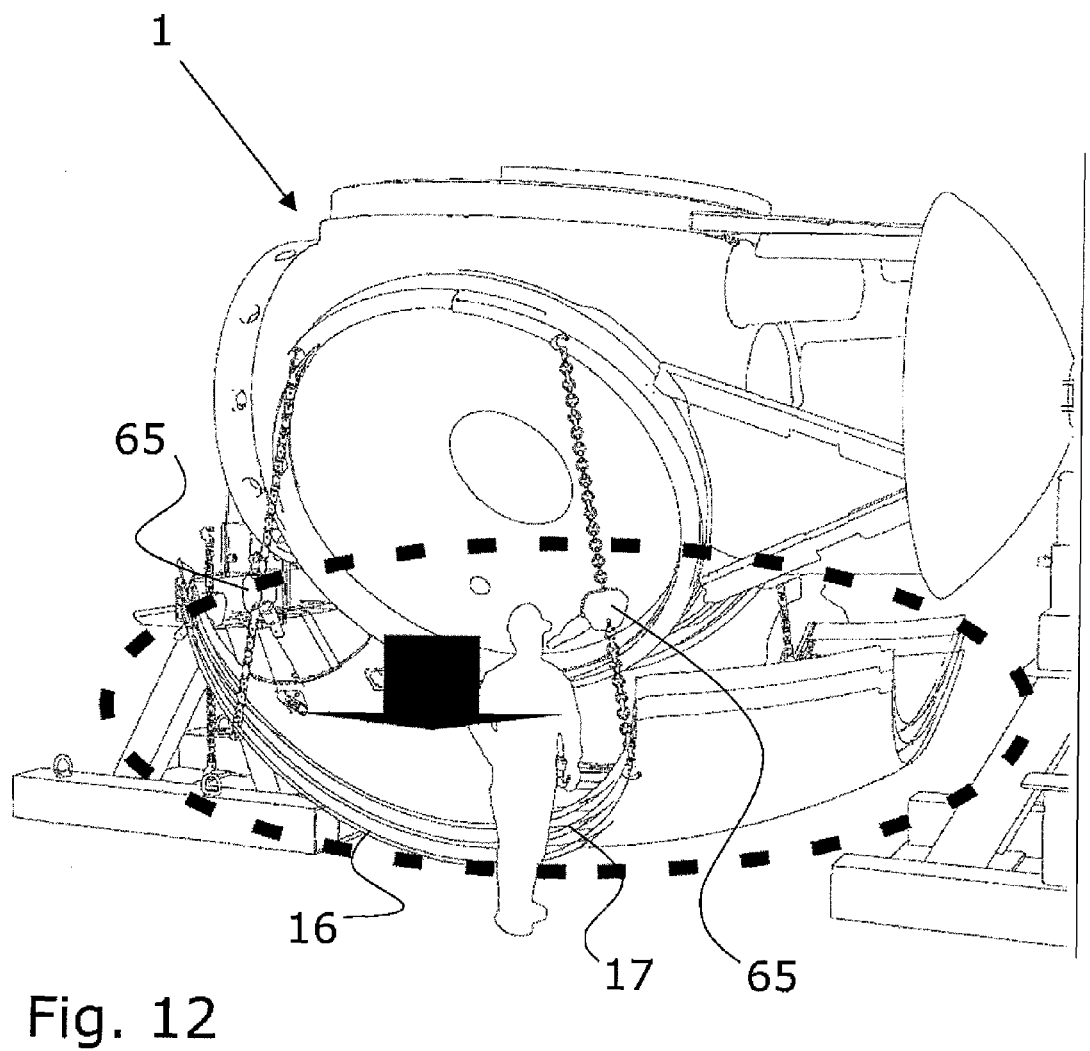
FIG. 12 shows different cover elements of the spinner module being dismounted from the hub, enabling subsequent mounting of the spinner module.

In FIG. 12, the hub 1 has been rotated 180 degrees so that the cover elements 16, 17 of the spinner module are below the hub 1. The cover elements may then be dismounted from the hub 1 and lowered to the ground, for instance by means of four chain ratchets 65. The chain ratchets 65 are arranged on each side of the hub 1 so that the cover elements 16, 17 may be lowered gently.

Figure 13:
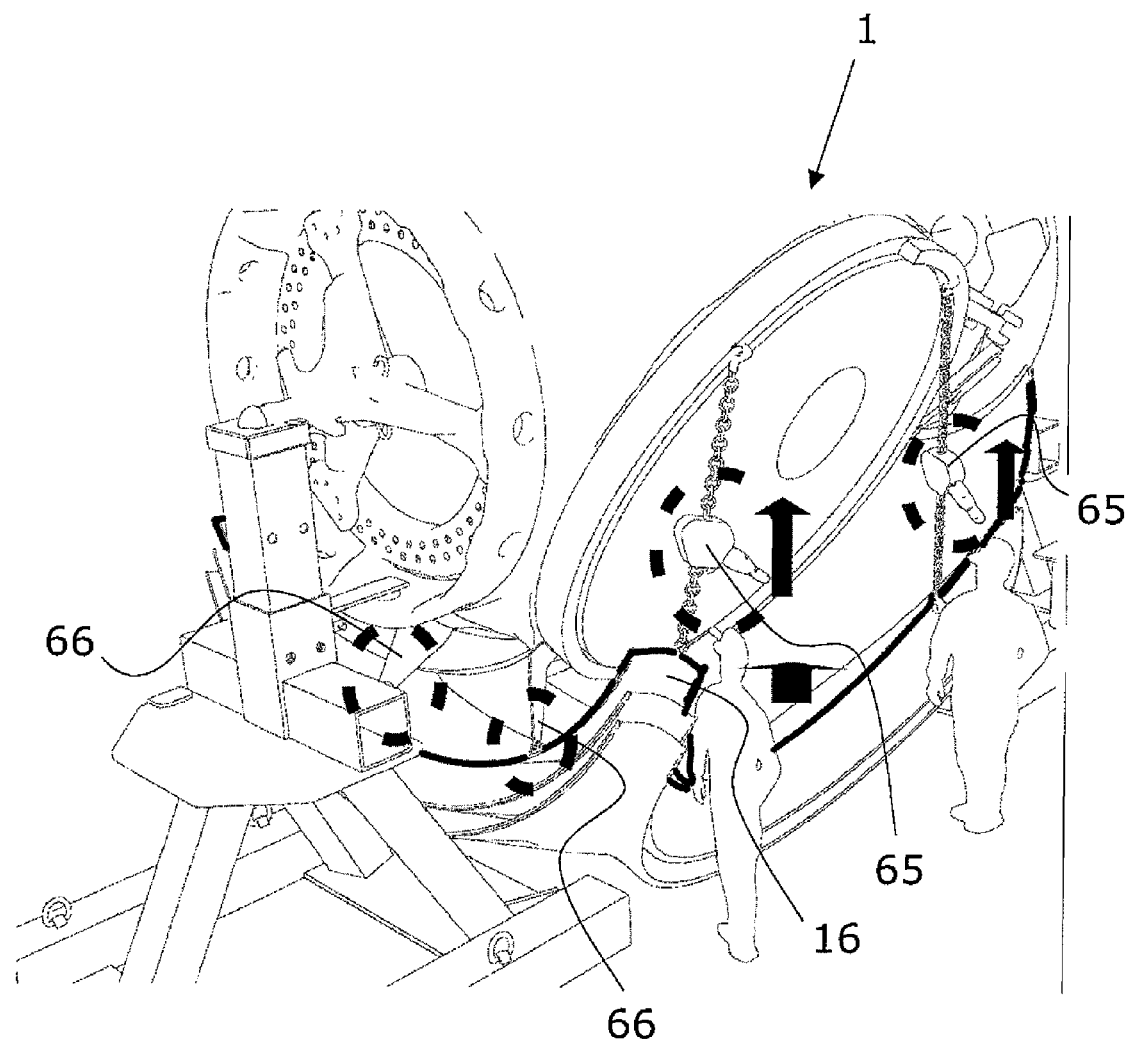
FIG. 13 shows one cover element of the spinner module being mounted on the hub.

In FIG. 13, a first cover element 16 is being mounted on the hub 1 by hoisting the cover element 16 by means of the chain ratchets 65 to a predetermined position, wherein the cover element 16 is connected to the hub 1 via a plurality of cover support brackets 66, ensuring that the cover element is positioned at a predetermined distance from the hub 1, thereby creating a space between the spinner module and the hub.

Subsequently, the chain ratchets 65 are removed, and the hub 1 is rotated 60 degrees. The chain ratchets 65 are then arranged so that the second cover element 17 may be hoisted and mounted onto the hub 1, as shown in FIG. 14.

Figure 14:
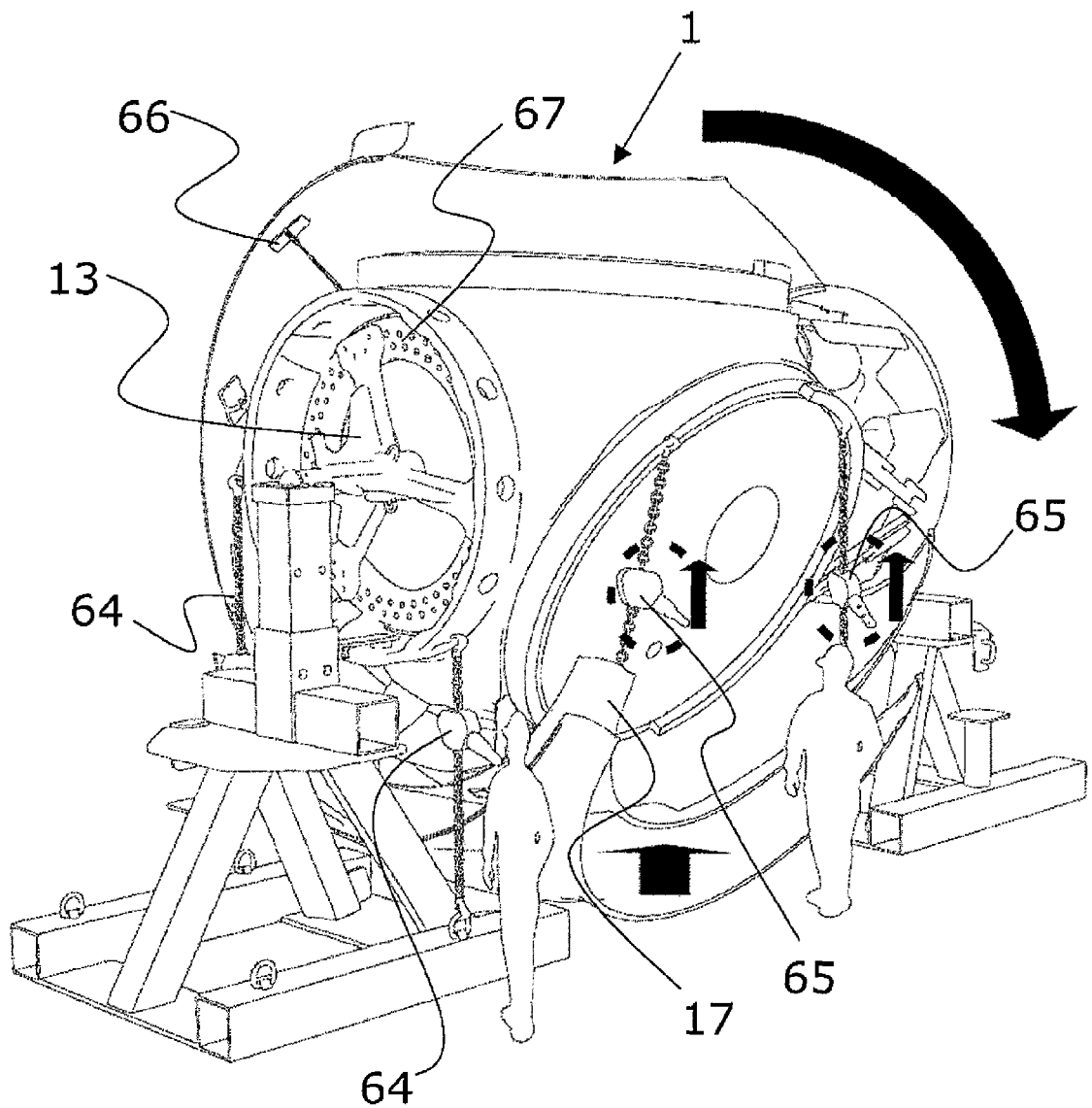
FIG. 14 shows another cover element of the spinner module being mounted on the hub.

Furthermore, as shown in FIG. 14, the rotation of the hub 1 is in this embodiment performed by means of the two chain ratchets 64. The rotation may be performed by shortening the chain of one of the chain ratchets while extending the chain of the other chain ratchets.

The above-mentioned procedure is continued until all cover elements of the spinner module are mounted on the hub 1, and the hub 1 is housed inside the spinner module and ready to be mounted on the wind turbine.

In addition, in FIG. 14, it is easily deduced how the spoke 13 is arranged on the main shaft bearing of the hub 1.

Although the invention has been described in the above in connection with preferred embodiments of the invention, it will be evident for a person skilled in the art that several modifications are conceivable without departing from the invention as defined by the following claims.

The invention claimed is:

1. A hub for a wind turbine, comprising:
a first end facing a nacelle of the wind turbine, and
a second end facing a direction opposite the nacelle,
the hub comprising at least one opening between the first and second end, which opening is adapted for receiving a wind turbine blade, the hub being adapted to rotate in relation to the nacelle by means of the wind turbine blade, and a self-supporting front structure being connected to the second end of the hub, which front structure extends from the second end of the hub and away from the nacelle and is arranged to support a spinner module, the spinner module being adapted to house the front structure and the hub,
wherein the front structure comprises a projecting part, which is part of the self-supporting structure and can extend from the front structure and away from the nacelle and comprises a connection point.

2. A hub according to claim 1, wherein the connection point is adapted to be connected to a lifting arrangement during transport/site handling of the hub and/or during installation of the hub on the wind turbine.

3. A hub according to claim 1, wherein a hoisting device is connected to the connection point.

4. A hub according to claim 1, wherein a guide wire or strap is connected to the connection point.

5. A hub according to claim 1, wherein the connection point is adapted to be connected to a frame structure during mounting of the spinner module.

6. A hub according to any one of the preceding claims, wherein the projecting part is either extendably arranged or securely connected to the front structure.

7. A hub according to any one of the preceding claims, wherein the connection point of the projecting part is positioned outside the spinner module.

8. A hub according to any one of the preceding claims, wherein the projecting part is adapted to carry a load of up to half the weight of a complete weight of the hub and front structure.

9. A hub according to any one of the preceding claims, wherein the front structure comprises a plurality of profiles, which in one end are connected to the hub and extend from the hub so that they, in the end opposite the hub, are connected to each other, creating a substantially pyramidal configuration of the front structure.

10. A hub according to claim 9, wherein the front structure comprises one or more internal connection points in connection with one or more of the profiles, enabling components positioned in the hub to be hoisted and displaced by use of the internal connection points.

11. A hub according to any one of the preceding claims, wherein the spinner module comprises openings in relation to the front structure, enabling components to be hoisted to or lowered from the hub through the openings.

12. A wind turbine comprising a hub according to any one of claims 1 to 11.

13. A frame structure for supporting a hub according to any one of claims 1 to 11 during handling of the hub and/or mounting of a spinner module, the frame structure comprising:
   a first supporting element adapted to be connected with a first end of the hub, and
   a second supporting element adapted to support a connection point of a projecting part of a front structure connected to a second end of the hub.

14. A frame structure according to claim 13, wherein the hub is rotatably supported by the frame structure.

15. A frame structure according to claim 14, wherein at least one of the supporting elements comprises means for rotating the hub.

16. A method for mounting a spinner module on a hub according to any one of claims 1 to 11, the method comprising the steps of:
   placing the hub on a frame structure according to any one of claims 13 to 15, a first end of the hub thus being connected to a first supporting element of the frame structure, a connection point of a projecting part of a front structure, which is connected to a second end of the hub, being supported by a second supporting element of the frame structure,
   mounting a first cover element of the spinner module,
   rotating the hub on the frame,
   mounting a second cover element of the spinner module, and
   performing the above steps of rotating the hub and mounting the cover element until the hub is housed in the spinner module.

17. A method for mounting a hub according to any one of claims 1 to 11 on a nacelle of a wind turbine, the method comprising the steps of:
   connecting a lifting arrangement to the hub and to a connection point of a projecting part of a front structure, the front structure being connected to the hub,
   hoisting the hub up to the nacelle, and
   connecting the hub to a main shaft of the nacelle.

18. A method for performing maintenance and/or inspection work on one or more wind turbine blades and/or other wind turbine elements, the method comprising the steps of:
   connecting a hoisting device to a connection point of a projecting part of a front structure, the front structure being connected to a hub according to any one of claims 1 to 11,
   connecting an element adapted for housing one or more persons to the hoisting device,
   placing one or more persons in the element, and
   hoisting the element up along the wind turbine while the persons perform the maintenance and/or inspection work.

19. A method for mounting a wind turbine blade on a hub according to any one of claims 1 to 11, the method comprising the steps of
   connecting a hoisting device to the hub via an opening in the hub,
   connecting the hoisting device to a root end of a wind turbine blade,
   placing a support element completely or partly around the wind turbine blade,
   connecting a guide wire or strap or a second hoisting device to a connection point of a projecting part of a front structure, the front structure being connected to the hub,
   connecting the guide wire or strap or the second hoisting device to the support element,
   hoisting the wind turbine blade up to the hub while using the connection point for guiding and/or balancing the wind turbine blade, and
   connecting the root of the wind turbine blade to a pitch bearing of the hub.

20. A method for demounting a wind turbine blade from a hub according to any one of claims 1 to 11, the method comprising the steps of:
   connecting a hoisting device to the hub via an opening in the hub,
   connecting the hoisting device to a root end of a wind turbine blade,
   placing a support element completely or partly around the wind turbine blade,
   connecting a guide wire or strap or a second hoisting device to a connection point of a projecting part of a front structure, the front structure being connected to the hub,
   connecting the guide wire or strap or the second hoisting device to the support element,
   demounting the root of the wind turbine blade from a pitch bearing of the hub, and
   lowering the wind turbine blade from the hub while using the connection point for guiding and/or balancing the wind turbine blade.

21. A method for hoisting one or more components up to a hub according to any one of claims 1 to 11, the method comprising the steps of
   connecting a hoisting device to a connection point of a projecting part of a front structure, the front structure being connected to the hub,
   connecting a component to the hoisting device,
   connecting a guide wire or strap to the front structure through an opening or hatch in the spinner module,
   connecting the guide wire or strap to the component,
   hoisting the component up to the opening or hatch while pulling the guide wire or strap to align the component with the opening or hatch, and
   pulling the component in through the opening or hatch.

* * * * *

UNITED STATES PATENT AND TRADEMARK OFFICE
CERTIFICATE OF CORRECTION

Page 1 of 2

PATENT NO.        : 7,874,805 B2
APPLICATION NO.   : 12/781415
DATED             : January 25, 2011
INVENTOR(S)       : Gunnar K. Storgaard Pedersen It is certified that error appears in the above-identified patent and that said Letters Patent is hereby corrected as shown below:

In the Drawings:
Please replace Drawing Fig. 10 with the new replacement Drawing Fig. 10.

Signed and Sealed this
Fifteenth Day of March, 2011

David J. Kappos
*Director of the United States Patent and Trademark Office*